M. W. HANCHETT.
Pianoforte Attachment.
No. 8,319. Reissued July 2, 1878.
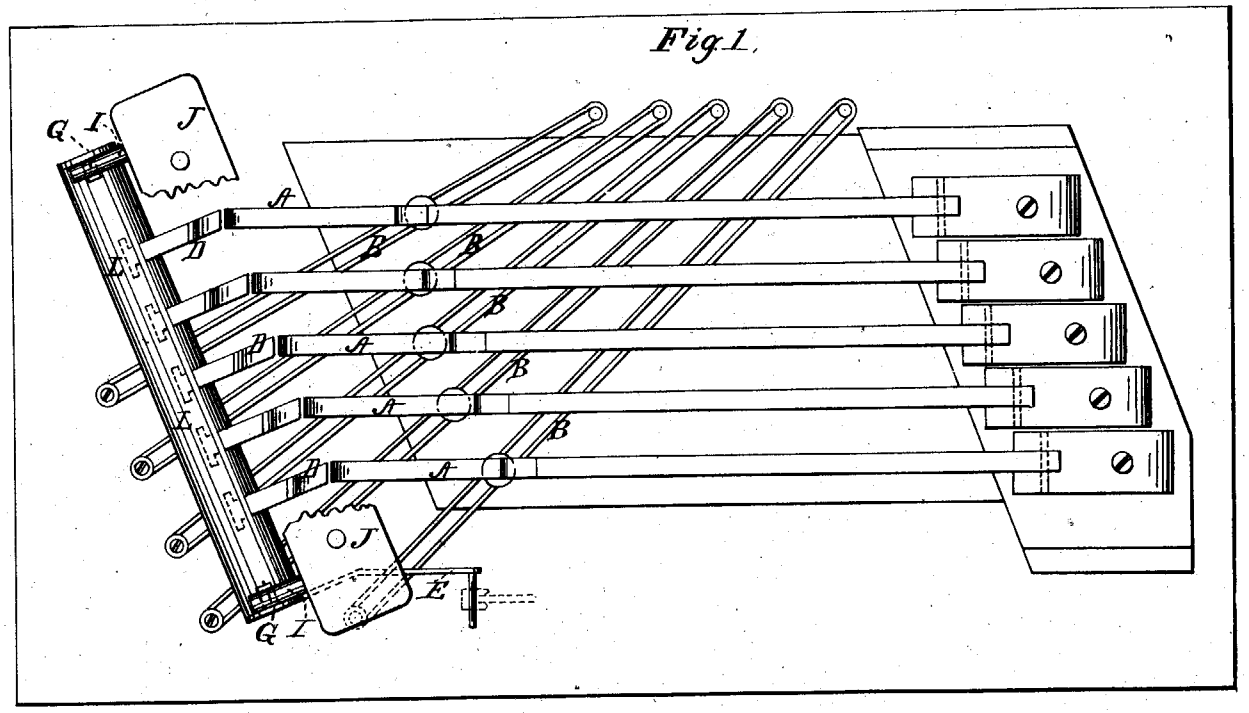
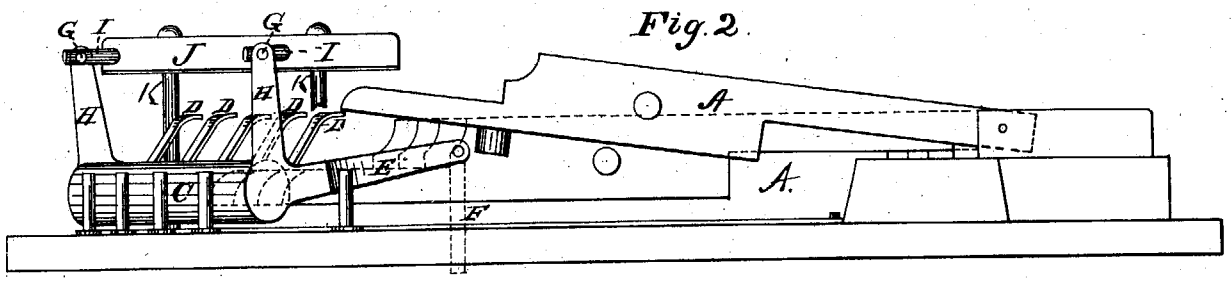
Witnesses
W. R. Edelin.
Pennington Halsted.
Fig. 3.
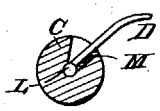
Inventor
M. W. Hanchett.
by John J. Halsted
Atty.
N. PETERS, PHOTO-LITHOGRAPHER, WASHINGTON, D. C.

UNITED STATES PATENT OFFICE.

M. WALDO HANCHETT, OF SYRACUSE, NEW YORK.

IMPROVEMENT IN PIANO-FORTE ATTACHMENTS.

Specification forming part of Letters Patent No. 153,766, dated August 4, 1874; Reissue No. 8,319, dated July 2, 1878; application filed May 2, 1877.

*To all whom it may concern:*

Be it known that I, M. WALDO HANCHETT, of Syracuse, in the county of Onondaga and State of New York, have invented a new and useful Improvement in Piano-Fortes, of which the following is a specification:

My invention relates to a mechanical attachment suited for and readily applicable to all kinds, styles, and patterns of piano-fortes; and it is designed to enable a performer to sustain or permit the continuance of the sound of a single one, two, or more strings or unisons after a key or keys by which the vibrations were produced have returned to their place of rest.

The attachment which constitutes my invention consists of a movable bar, operating to catch, arrest, intercept, or obstruct one or more of the dampers or attachments thereto, and to hold one or more of them at will away from the strings, after such damper or attachments have been actuated by means other than and independent of the movable bar; and it consists in other features hereinafter set forth, the invention being simple and free from complicated mechanism, and adapted to be readily applied to pianos already constructed, and to be operated by an ordinary pedal.

The attachment, as represented in the drawings, in which is shown an adaptation to square pianos having the so-called "over-dampers," is composed of a bar or rod, of wood or other material, suspended near the ends of the dampers, so as to move toward and from them, and having a series of any desired number of tongues or jacks, of metal or other material, attached to it, said tongues projecting toward the dampers, and placed the same distances apart as they are, and the bar being connected with a pedal, so that after the dampers have been raised they may be caught by the tongues (one or more) and held off the strings after the keys go back, by causing the bar to move forward by the action of the pedal and move the tongues under the dampers, and when the bar is allowed to move back, the tongues will withdraw and leave the dampers unaffected by them. The tongues are also hinged to the bar, so as to swing upward and allow the dampers to rise and fall under them without obstruction, while holding other dampers up.

In the accompanying drawing, Figure 1 is a plan view of a portion of a piano, showing the application of my attachment to square pianos having the so-called "over-dampers." Fig. 2 is a side elevation, and Fig. 3 is a cross-section of the tongue or jack bar.

Similar letters of reference indicate corresponding parts.

A represents the dampers, and B the strings. C represents the movable bar, and D the tongues or jacks of my attachment; and E, an arm or crank by which to attach a rod, F, for connecting the bar with a pedal for working it. This bar is suspended from pivots G by arms H, so as to move toward and from the dampers. The pivots are on arms I, projecting from a stand, J, supported by rods K. The jacks are hinged to the bar at L, so as to swing upward readily; but they rest on shoulders M, which maintain them at the proper height for catching and holding the dampers. The tongues may have a sliding motion, instead of swinging, if made to work independently of each other; but they will probably work easier and with less wear by swinging.

The object of the swinging motion of the bar is, that the tongues will swing low down under the dampers, so as not to strike against them.

The apparatus is so arranged and adjusted that while at rest the dampers may pass the ends of the tongues freely. When the bar is moved forward only such dampers as are already up are caught or retained by the tongues. The dampers at rest allow the tongues to pass above them; and if, while the tongues are forward, a damper is lifted, the tongue immediately over it is free, by reason of its joint or hinge, to be carried up with it, and in this position it will not catch or retain the damper. Thus, while a lifted damper is being held up by one of the tongues, other dampers are free to act without being arrested or held.

The improvement is most desirable and effective when applied to the tones of the piano below what is known as the "middle C." A base or fundamental tone may thus be continued after being sounded, while at the same time both hands are at liberty to perform upon other keys, in effect giving a pedal note to lighter harmonies being played on other parts of the instrument.

To produce this result, a key is struck and its damper thrown up from the string. The foot is then pressed on the pedal connected with the bar, and the bar is thrown forward, causing a tongue to catch and retain the uplifted damper, while the key is allowed to assume its former position by removal of the hand. The string is thus left free to vibrate, and its sound to continue until vibration ceases, or until the damper is allowed to drop by the removal of the foot from the pedal.

The apparatus may also be used to sustain as many of the dampers at one time as the number of the tongues attached to the bar, by first lifting all the dampers by means of the forte or damper pedal, and then moving the tongues under them. Thus the effect of a divided pedal may be produced. This pedal does not in any way interfere with or impede the action of the ordinary pedals. Other beautiful effects may be produced with this improvement by skillful performers.

It will be observed that my movable bar does not in its movements actuate or lift a damper or dampers; but on the contrary it serves only to arrest, intercept, obstruct, or hold such of them as may be desired after the damper has been already lifted or moved, such lifting or moving being effected by means other than and independent of the movable bar.

The essential principle of my invention, it will be seen, is that the movable bar may, when actuated, be brought into range to cause the interception or arrest of the particular damper or dampers desired.

In the practical construction of the apparatus, the form, construction, and arrangement will be varied, to adapt it for use in any kind or style of piano.

I propose to call my improvement a "Sostenuto Pedal."

This apparatus or improvement may be so arranged or placed in a piano-forte as that in operation it will catch or act upon the damper-lifters, levers, keys, or damper-connections, as may be required by the peculiar form or construction of a piano-forte or its action, or differing from the piano as here described.

Having thus described my invention, I claim as new and desire to secure by Letters Patent—

1. In a piano-forte, a movable bar constructed and arranged to operate while acted upon and retained by means of a pedal to arrest or suspend the action of either a single one or a larger number, at option, of such dampers as are removed from the strings by means independent of said bar or its pedal, for the purposes hereinbefore described.

2. The movable bar C, provided with arms or hangers, or their equivalent, by which it may be sustained, or the direction of its motion guided or governed, and whereby it will operate to catch or act upon the dampers, their lifting-levers, keys, or connections in a piano-forte, substantially as and for the purposes set forth.

3. A single bar arranged to move in a plane horizontally, or nearly so, and constructed to arrest and hold up or off the strings the dampers, one or more, at option of the player, substantially as and for the purposes set forth.

4. As an attachment for a piano-forte of ordinary construction, a movable bar adapted to operate for the arrest or to suspend the action of either a single damper or a larger number of the dampers of such piano, at option of the player, for the purposes hereinbefore described.

5. In a piano-forte, a series of tongues hinged or otherwise attached to a movable bar, and arranged to operate substantially as and for the purposes hereinbefore set forth.

6. In combination with the dampers, damper-lifters, levers, or connections of a piano-forte, a series of tongues and movable bar, arranged to operate substantially as and for the purposes set forth.

M. WALDO HANCHETT.

Witnesses:

H. B. CHAMBERLIN,

G. L. BONTA.